US012795449B2

(12) United States Patent
Lakshmikanta et al.

(10) Patent No.: US 12,795,449 B2
(45) Date of Patent: Nov. 10, 2026

(54) AUTOMATED CELL SITE PROVISIONING IN 5G RADIO-ACCESS NETWORKS

(71) Applicant: VMware LLC, Palo Alto, CA (US)

(72) Inventors: Ashvin Lakshmikanta, Karnataka (IN); Qiang Tang, Beijing (CN); Kiran Kumar Cherivirala, Karnataka (IN); Rohit Muttepwar, Maharashtra (IN); Siva Polepalli, Bangalore-Karnataka (IN); Hemant Sadana, Karnataka (IN); Weiqing Wu, Palo Alto, CA (US); Sureshbabu Koyadan Chathoth, Karnataka (IN); Praveen Saxena, Karnataka (IN); Anurag Dwivedi, Karnataka (IN)

(73) Assignee: VMware LLC, Palo Alto, CA (US)

( * ) Notice: Subject to any disclaimer, the term of this patent is extended or adjusted under 35 U.S.C. 154(b) by 331 days.

(21) Appl. No.: 18/405,549

(22) Filed: Jan. 5, 2024

(65) Prior Publication Data

US 2025/0126521 A1 Apr. 17, 2025

Related U.S. Application Data

(63) Continuation of application No. PCT/CN2023/124475, filed on Oct. 13, 2023.

(51) Int. Cl.
*H04W 28/086* (2023.01)
*H04W 28/18* (2009.01)

(52) U.S. Cl.
CPC ....... *H04W 28/0864* (2023.05); *H04W 28/18* (2013.01)

(58) Field of Classification Search
CPC . H04W 28/0864; H04W 28/18; H04W 24/02; G06F 9/455; H04L 41/0266; H04L 41/0869; H04L 41/0886; H04L 41/0895; H04L 41/40; H04L 41/5054; H04L 41/0806
See application file for complete search history.

(56) References Cited

U.S. PATENT DOCUMENTS 11,336,525 B1 5/2022 Chivukula et al.
11,544,042 B1 1/2023 Naik et al.
2023/0029632 A1 2/2023 Sambandan et al.
2023/0251872 A1 8/2023 Dockter et al.

OTHER PUBLICATIONS

European Patent Office, Extended Search Report, Application No. 24150580.9, Jun. 7, 2024, 9 pages.

*Primary Examiner* — Eric Myers
(74) *Attorney, Agent, or Firm* — Quarles & Brady LLP

(57) ABSTRACT

In an example, a method for provisioning a cell site in a 5G RAN may include receiving a plurality of steps involved in provisioning the cell site for the 5G RAN. In an example, provisioning the cell site may include provisioning of a physical infrastructure layer, a container orchestration platform on the physical infrastructure layer, and a containerized network function (CNF) instance associated with the 5G RAN in the container orchestration platform. Further, the method may include converting the plurality of steps into a dependency graph of tasks. The dependency graph may represent workflows and relationships between the tasks. Furthermore, based on feeding the dependency graph as an input to an orchestrator, the method may include provisioning the cell site by executing the tasks in an order according to the dependency graph.

20 Claims, 5 Drawing Sheets

```
{
        "ssh" : [          302
            {
          "host" : "test1.eng.vmware.com",
            "name" : "NIC Firmware Version",
            "command" : "ethtool -i eth0 | grep 'firmware-version' | cut -f2 -d':'",
            "expected_output" : "2.0.1",
            "match" : "=="
            "timeout": "2"
            }
         ]

        "redfish" : [ {          304
           "host" : "test1.eng.vmware.com",
         "name" : "Check BIOS version"
        "command": "/redfish/v1/bios/version",
        "expected_response" : "200",
        "output_field" : ["bios", "version"],
        "expected_output" : "1.6.5",
        "match_type": ">="
        "timeout" : "3"
}]}
```

300

FIG. 3

AUTOMATED CELL SITE PROVISIONING IN 5G RADIO-ACCESS NETWORKS

CROSS-REFERENCE TO RELATED APPLICATIONS

This application is a continuation of PCT/CN2023/124475 filed on Oct. 13, 2023, by LAKSHMIKANTA et al. and titled, "AUTOMATED CELL SITE PROVISIONING IN 5G RADIO-ACCESS NETWORKS," the entire teachings of which is incorporated herein by reference in its entirety for all purposes.

TECHNICAL FIELD

The present disclosure relates to wireless communication networks.

BACKGROUND 5G radio-access network (RAN) in wireless communications uses 5G radio frequencies to provide wireless connectivity to devices. 5G mobile communication revolutionized the way to interact with each other with a number of applications (e.g., telemedicine, robotic surgery, self-organizing autonomous cars, internet of things (IOT), and so on) that are riding on 5G. The 5G offers Gigabit speeds with ultra-low latencies. Further, the telecommunication industry is accelerating as transition to 5G business, container orchestration platform, and cloud-native network functions (CNFs) solutions are getting more attention and deployment.

A RAN is a key component of a mobile telecommunication system that connects devices (e.g., smartphones, personal computers, and the like) to a network via a radio link. This is achieved by converting voice and data into digital signals and transmitting them as radio waves to RAN transceivers, which then forward them onto the core network. From the core network, the data can be sent to the internet. The RAN is the radio element of a cellular network. A cellular network is made up of land areas called base stations or cell sites. In such an environment, stringent latency requirements and the ultra-high speeds imply that a significantly large number of cell sites may have to be deployed. For example, the number of base-stations that has to be deployed in a country such as USA may be in the range of 250,000-300,000.

BRIEF DESCRIPTION OF THE DRAWINGS

FIG. 3 shows an example program in a JSON format to validate hardware and/or software requirements of an operating system, a container orchestration platform, and a containerized network function (CNF);

Figure 1:
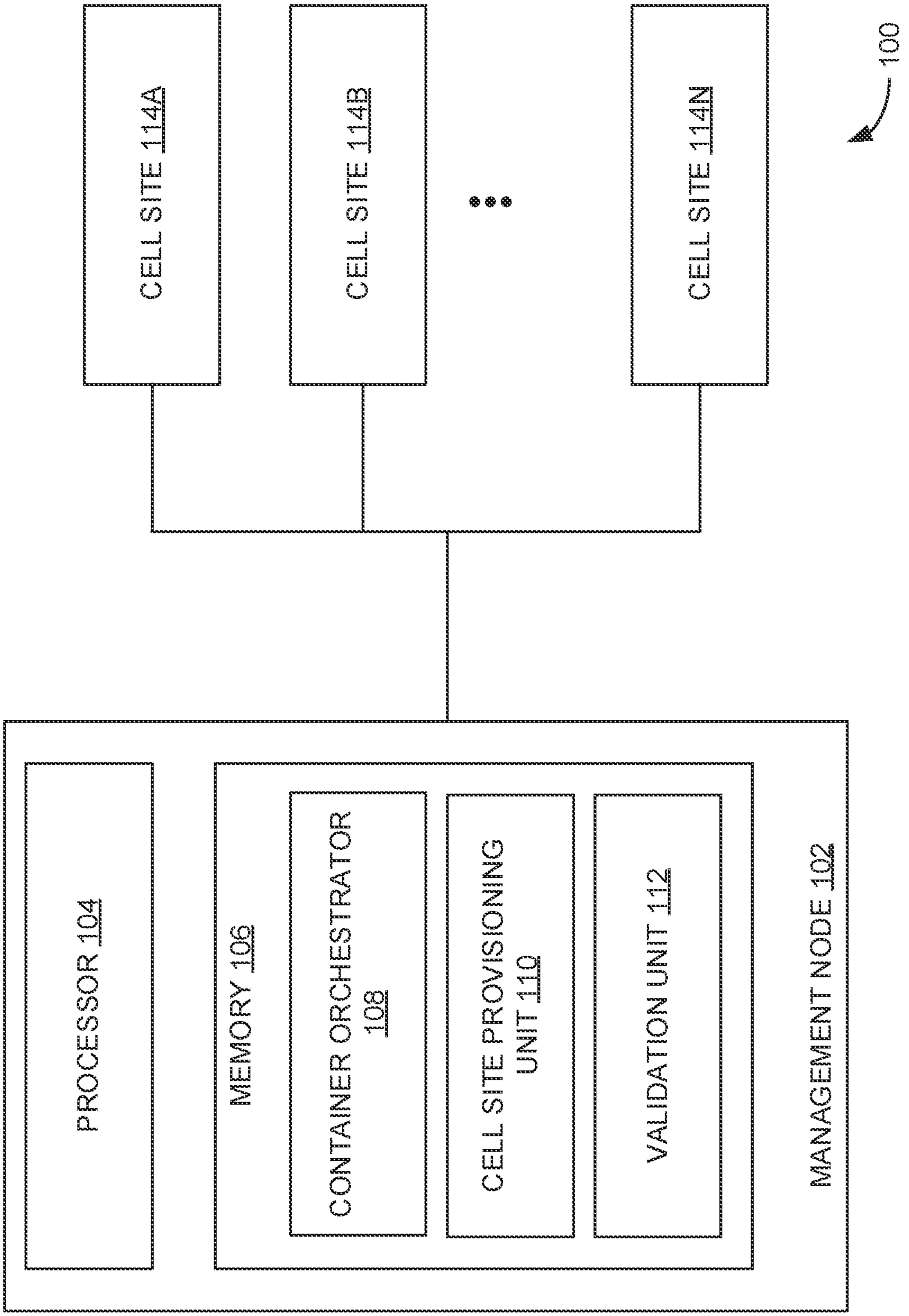
FIG. 1 is a block diagram of an example system, including a cell site provisioning unit to provision a cell site in a 5G radio-access network (RAN)

The drawings described herein are for illustrative purposes and are not intended to limit the scope of the present subject matter in any way.

DETAILED DESCRIPTION

Examples described herein may provide an enhanced computer-based and/or network-based method, technique, and system to automatically provision cell sites in 5G radio-access networks (RAN). An overview of 5G RAN, existing methods to provision the cell sites in the 5G RAN, and drawbacks associated with the existing methods is provided below.

A RAN is a part of a telecommunications system that connects individual user devices (e.g., a smart phone, a personal computer, and the like) to other parts of a network through radio connections. The RAN may reside between the user devices and provides the connection with its core network. The RAN is a major component of wireless telecommunications and has evolved through the generations of mobile networking leading up to 5G. The RAN provides access to and coordinates the management of resources across cell sites.

The telecommunication industry is accelerating as transition to 5G business, container orchestration platform, and cloud-native network functions (CNFs) solutions are getting more attention and deployment. A container orchestration platform can have multiple pods, with each pod representing a group of one or more application containers, as well as some shared resources for those containers. A container orchestration platform can host different container-based platforms that support different functions. For example, a container-based platform can be added to a container orchestration platform to support telco CNFs. Further, a container-based platform can be added to a container orchestration platform to support Telco RAN CNFs and to make sure that the Infra as a Service (IaaS) and Containers as a service (CaaS) platforms meet network functions' (NFs') requirements and achieve good performance per 5G standards.

In some examples such as 4G network deployments, the RAN cell sites had vertically integrated solutions and the management interface was a closed source. Further, the hardware that was running the RAN software was also proprietary. There was no play for companies like VMware in the 4G network deployments. In 5G, the RAN cell site for the first time would be deployed on commercial-off-the-shelf (COTS) hardware. Further, the RAN software (e.g., containerized network function (CNF)) is deployed on Kubernetes platform, which is also open source. Thus, it is possible for third-party vendors (e.g., such as VMware) to deploy and manage the life cycle management (LCM) of the cell-sites.

Further, along with the progression of mobile technology, the complexity of its management has significantly increased many folds. For example, the manpower to deploy a cell site manually at every tower is cost-prohibitive due to the scale/complexity. The need of the hour is a remote automation solution that can provision the cell site. The physical presence of the human at the cell-site is only utilized for connecting the cables and setting up the networking to reach the automation server.

In some existing scenarios, 5G vendors (e.g., Ericsson, Nokia, and the like) have solutions to deploy their network functions, once the platform is ready. However, they lack the solution to provision the platform or the hardware remotely. In other examples, there are solutions from hardware management companies that can provision their hardware remotely (such as DELL). There are K8s management companies that can deploy Kubernetes platform and configure them remotely (such as rancher). However, with the existing solution an operator may have to:

Identify the RAN software requirements in terms of hardware/platform capabilities.

Use hardware vendor solution to manage the hardware.

Use the output of the hardware preparation and deploy the K8s platform.

Then use RAN software vendor provided solution to deploy the 5G application.

In an example, Telco Cloud Automation (TCA) is a VMware solution that is responsible for all three functions (e.g., hardware provisioning, K8s provisioning, and CNF deployment). In TCA terminology, the cell-site needs to go through three stages for site provisioning such as host provisioning (e.g., zero-touch provisioning (ZTP)), K8s provisioning (e.g., containers as a service (CAAS)), and network function deployment (e.g., CNF). However, even though TCA has the functionality to deploy a cell site end-to-end (E2E), each of the provisioning steps is independent. Consequently, the results of one phase may not be automatically propagated to the subsequent stage. So, the entire process has to be manual, which reduces the overall deployment velocity. For example, the number of base-stations that need to be deployed may be in the range of 250,000-300,000 for a country such as USA. An example single tier-II operator would own and manage upwards of 35,000 sites. An example tier-I operator is looking at 70,000-100,000 sites. Hence, manually provisioning each of the cite sites may be significantly time consuming.

Further, each of the function has its own user interface (UI) and the UI may not be useful to manage a significantly large number of cell sites (e.g., tens of thousands of cell sites). The UI may have to be minimalistic and only report issues that require human attention. Furthermore, there is no central place to validate whether all the inputs are correct. This can cause misconfigurations relatively easily and lead to failed deployments. Misconfigurations of a specific stage are discovered as the task is executed. Thus, significant effort may be wasted in reverting the changes made due to misconfigurations.

In addition, when a deployment fails for any reason, the error has to be fixed first. Further, a specific stage may have to be identified and the tasks has to be started. There can be issues with this method as the user needs to go to the specific stage, identify the failed task, and follow the procedure listed in the documentation to retrigger. Thus, the user may have to learn each stage. Each stage may have its own payload. Thereby, the user may have to translate the input payload to the format that's accepted by that stage.

Further, the CNF imposes a number of requirements on K8s and hardware. Such requirements may have to be available as part of hardware provisioning or K8S provisioning. However, if any configuration is missing, then the only way to enable it is to write a script and manage it manually. The user may have to make sure that the script is called at the right time (e.g., when a Container Network Interface (CNI) needs to be enabled, the corresponding script may have to be called only after the K8S is deployed). However, a large number of out-of-band modifications are necessary to deploy the CNF. In an example use-case, no less than 15-20 such modifications were used in production deployments. Moreover, there is no easy way to track the progress of a single cell site with all the scripts. Managing such a solution at scale may be challenging and invariably leads to significantly more manpower being employed to troubleshoot the cell sites.

Examples described herein may provide a management node to automatically provision cell sites in 5G radio-access networks. The management node may automate deployment, management, and scaling of containerized network function (CNF) instances. During operation, the management node may receive a plurality of steps involved in provisioning a cell site for a 5G RAN. In an example, provisioning the cell site may include provisioning of a physical infrastructure layer, a container orchestration platform on the physical infrastructure layer, and a CNF instance associated with the 5G RAN in the container orchestration platform. Further, the management node may convert the plurality of steps into a dependency graph of tasks. The dependency graph may represent workflows and relationships between the tasks. Furthermore, based on feeding the dependency graph as an input, the management node may provision the cell site by executing the tasks in an order according to the dependency graph.

Thus, examples described herein may enable to deploy a generic infrastructure of the cell site and then customize the cell site on the fly. Also, examples described herein may make it possible to deploy the RAN application on top of the generic infrastructure.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example system 100, including a cell site provisioning unit 110 to provision a cell site (e.g., 114A-114N) in a 5G radio-access network (RAN) 100. In some examples, the 5G RAN is an architecture in wireless communication which uses 5G radio frequencies to provide wireless connectivity to user devices. An example user device may be a smart phone, a tablet computer, a laptop computer, a handheld computer, a personal digital assistant (PDA), a wearable device, an Internet of Things (IoT) device, an email device, a desktop computer, or an appropriate combination of any two or more of these devices or other data processing stationary or portable devices. Further, the 5G RAN may rely on a fully coordinated, multi-layer network with low-band, mid-band, and high-band to provide wireless connectivity to devices and deliver the best network performance. New 5G use cases may deliver new revenue streams for communication service providers (CSPs) and new connectivity opportunities for subscribers (e.g., use cases may include cloud gaming, virtual reality (VR)/augmented reality (AR), autonomous driving fixed wireless access).

Further, the RAN is a key component of a mobile telecommunication system that connects the user devices to a network via a radio link. This may be achieved by converting voice and data into digital signals and transmitting them as radio waves to RAN transceivers, which then forward them onto the core network. From the core network, the data can be sent to the internet. Furthermore, to achieve such connections between the user devices and the network, at least one cell site (e.g., 114A-114N) may have to be provisioned.

In an example, cell sites 114A-114N may be provisioned by a management node 102. Further, management node 102 may include a processor 104. Processor 104 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein. Further, management node 102 includes memory 106 coupled to processor 104. In an example, memory 106 may include a container orchestrator 108, cell site provisioning unit 110, and a validation unit 112. Furthermore, processor 104 may execute container orchestrator 108, cell site provisioning unit 110, and a validation unit 112 stored in memory 106.

In an example, container orchestrator 108 may automate deployment, management, and scaling of containerized network function (CNF) instances. During operation, cell site provisioning unit 110 may receive a plurality of steps involved in provisioning a cell site (e.g., 114A-114N) for a 5G RAN. In an example, provisioning cell site 114A-114N may include provisioning of a physical infrastructure layer, a container orchestration platform on the physical infrastructure layer, and a CNF instance associated with the 5G RAN in the container orchestration platform. In an example, based on requirements of the CNF instance, container orchestrator 108 may provision the physical infrastructure layer by preparing a physical host computing system to configure hardware, software, and network resources.

Further, cell site provisioning unit 110 may convert the plurality of steps into a dependency graph of tasks. In an example, the dependency graph may represent workflows and relationships between the tasks. For example, the dependency graph may include a plurality of vertices and a plurality of edges, each vertex representing a task for execution and each edge representing a path that the container orchestrator needs to take upon completion of each task. An example task may include validation of input, validation of the host, install an operating system (OS) on the host, upgrade OS/Packages on the host, configure networking on the host, update networking on the host, copy VM images to the host, configure firewall rules on the host, deploy Kubernetes worker node on the host, update/upgrade Kubernetes (i.e., docker engine), deploy CNF, upgrade CNF, delete CNF, or any combination thereof.

Furthermore, based on feeding the dependency graph as an input to container orchestrator 108, cell site provisioning unit 110 may provision cell site 114A-114N by executing the tasks in an order according to the dependency graph.

In an example, prior to provisioning cell site 112A-112N, validation unit 112 may receive method of procedure (MOP) steps to validate hardware and/or software requirements of an OS of the physical infrastructure layer, the container orchestration platform, and the CNF instance from multiple vendors. Further, validation unit 112 may convert the MOP steps into a defined data structure. In an example, the defined data structure is generic and extensible. Furthermore, validation unit 112 may validate, based on feeding the defined data structure as an input to the container orchestrator, the hardware and/or software requirements of the operating system, the container orchestration platform, and the CNF.

In an example, for each hardware and/or software requirement, validation unit 112 may enable container orchestrator 108 to initiate a command on the physical infrastructure layer by making a call to an interface exposed by a respective hardware and/or software component in the physical infrastructure layer. Further, validation unit 112 may compare a result of executing the command with an expected output in the defined data structure. In one example, when the result of executing the command matches the expected output, validation unit 112 may determine that the validation is successful. In another example, when the result of executing the command does not match the expected output, validation unit 112 may determine that the validation is not successful.

In an example, container orchestrator 108 may determine whether the physical infrastructure layer and the container orchestration platform support requirements of the CNF instance. In one example, when the physical infrastructure layer and the container orchestration platform support requirements of the CNF instance, container orchestrator 108 may invoke, by the tasks, documented application programming interfaces (APIs) to achieve a required functionality. In another example, when the physical infrastructure layer and the container orchestration platform do not support requirements of the CNF instance, container orchestrator 108 may generate and add additional tasks to the orchestrator to support the requirements of the CNF instance.

Figure 2:
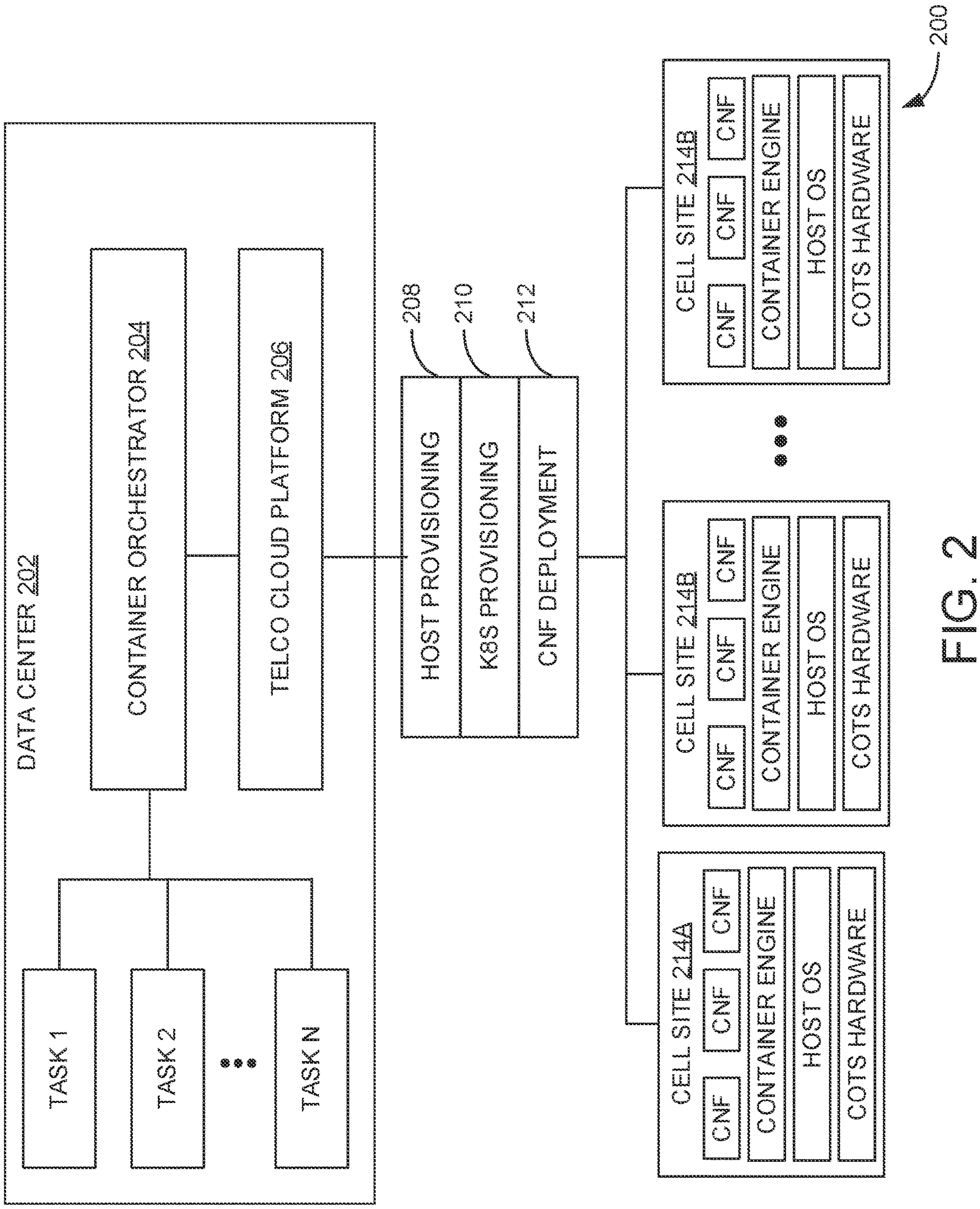
FIG. 2 is a block diagram of another example system, including a container orchestrator to automate provisioning of a cell site in a 5G RAN.

FIG. 2 is a block diagram of another example system 200, including a container orchestrator 204 to automate provisioning of a cell site (e.g., 214A-214N) in a 5G radio-access network (RAN). In some examples, Telco cloud platform 206 is a software-defined, highly resilient cloud infrastructure that allows telecommunications service providers (telcos) to add services, respond to changes in network demand, and manage central and decentralized resources efficiently. For example, VMware Telco Cloud Platform™ (e.g., 5G Edition) is a cloud-native platform powered by field-proven VMware Telco Cloud Infrastructure™ coupled with automation, providing a cloud-first approach that delivers operational agility for virtual, cloud-native 5G, and Edge network functions. Telco Cloud Platform 206 may facilitate Communication Service Providers (CSPs) expedite the innovation cycle to deliver new applications and services, reduce operational complexities, and achieve substantial TCO savings over other approaches, further accelerating CSPs' cloud modernization journey to 5G.

Example system 200 may include a data center 202 including a management node to deploy and manage multiple cell sites 214A-214N. As shown in FIG. 2, data center 202 may include a container orchestrator 204 and Telco cloud platform 206. For example, a high-level container orchestrator 204 (e.g., Airflow, Temporal, Netflix conductor, or the like) may stitch different components into a single E2E workflow.

Further, Telco cloud platform or Telco Cloud Automation (TCA) 206 is a VMware solution that is responsible for functions such as hardware provisioning (e.g., 208), K8s provisioning (210) and CNF deployment (e.g., 212). In TCA, cell sites 214A-214N may have to go through three stages for site provisioning such as host provisioning (e.g., Zero-touch provisioning (ZTP) 208), K8s Provisioning (e.g., containers-as-a-service CAAS 210), and network function deployment (e.g., CNF 212). An orchestrator would run on top of TCA to stitch together these functions and provide a single workflow for the end-user to execute.

During operation, container orchestrator 204 may convert steps (e.g., sequence of steps that need to be followed to provision a cite site (e.g., 214A)) involved in bringing up cell site 214A to orchestrator tasks (e.g., a graph of tasks (e.g., task 1-task N) that can be consumed by container orchestrator 204). For example, the vertices of the graph may represent the tasks that may have to be executed. The edges may represent the path that container orchestrator 204 may have to take upon completion of each task. Further, the graph is fed to container orchestrator 204 so that container orchestrator 204 knows the sequence and the order of tasks that need to be executed to provision cell site 214A. In the example shown in FIG. 2, provisioned cell sites 214A-214N include COTS hardware running a respective operating system (i.e., a host OS), container engine deployed on the cots hardware to run multiple containers, and CNF instances running inside the containers.

In an example, the tasks (e.g., task 1-task N) in container orchestrator 204 may be developed in an idempotent fashion. For example, upon correcting the failed sites, a user may have to call only one application programing interface (API) irrespective of where the failure occurred. The idempotency ensures that the user may have to know the schema of the first task. In case of retriggering failed sites, idempotency ensures that user needs to use one payload and one API call irrespective of where the failure occurred. Further, container orchestrator 204 may manage all the translations between vendors as tasks.

In an example, container orchestrator 204 may monitor each of tasks 1-task N. Thus, container orchestrator 204 may track whether the orchestrator task has started execution and whether the execution is successful or not. Further, container orchestrator 204 may send information about the progress of the task to external stakeholders using technologies such as message bus, Representational State Transfer (REST) APIs, or so on. These updates can be processed and stored in a database (such as Prometheus, Victoria Metrics, Elastic Search, and the like). For example, for a given cell site, container orchestrator 204 may use a common ID (e.g., a site-id) across different tasks to enable creation of the site view. Further, every update to the external stakeholders may include the site-id so that the identity of the cell site associated with the update is established. Furthermore, queries on the database may be used to create a site level view (e.g., using the site-id as a key) from the task updates. The use of a common site-id ensures to create a site-view using task specific updates. Further, the site-view provides the user everything they need to know about the cell site progress in a single graphical user interface (GUI).

In one example, when underlying products (e.g., host provisioning and K8s provisioning) support the required CNF capability, the task would invoke the documented APIs of the product to achieve the required functionality. In another example, when the underlying products do not support required CNF capability, additional tasks are added in container orchestrator 204 itself to support the capability. In an example, container orchestrator 204 may control the order in which these steps need to be executed.

Thus, container orchestrator 204 can manage execution of thousands of tasks in parallel. This makes container orchestrator 204 approach ideal to reach significantly high cell site provisioning velocities. Thus, with the examples described herein, the E2E pipeline may significantly reduce human errors and in general the need for human interaction and the product UI is required only for identifying failures, which is significantly smaller. Also, examples described herein may allow operator to provision the entire cell site (e.g., from hardware provisioning to CNF deployment) in a single workflow. Further, the use of an orchestrator framework allows the user to add custom tasks in the future making the solution extensible to handle new CNFs, Kubernetes/host versions, and so on. Thus, examples described herein may allow the operator to deploy/manage a significantly large number (e.g., hundreds) of cell sites in parallel, and improving the speed of bringing up the cell sites.

FIG. 3 shows an example program in a JSON format to validate hardware and/or software requirements of an operating system, a container orchestration platform, and a CNF. In an example, as each component of the hardware and the software can come from different vendors, the software would have its own requirements on the underlying infrastructure such as:

- Operating systems may have certain memory/CPU requirements.
- Kubernetes bare-metal deployment might be possible only on specific servers with specific BIOS versions.
- CNF's may require a single root I/O virtualization (SRIOV) to be enabled in BIOS and in the operating system.
- CNF's may require accelerators.

In general, the vendors list these requirements as part of a method of Procedure (MOP) or the installation guide. Further, a customer may prepare the environment as per the MOP/Installation guides. Furthermore, the customer may validate the requirements before triggering the deployment of the specific software. In the examples described herein, the pre-requisites may be validated by converting the MOP steps into a task that gets invoked by a container orchestrator. As a first step, notice that every software component includes well defined interfaces to interact with it. Even if no operating system is deployed on the server, commercial servers may expose an intelligent platform management interface (IPMI) to interact with the hardware. Examples described herein may propose that the validation task in the container orchestrator may be a collection of plugins for interacting with specific interfaces (e.g., Secure Socket Shell (SSH), Representational State Transfer (REST), IPMI, Redfish, and so on).

In an example, the validations required for a software component may be converted to JSON (or YAML) data 300 as shown in FIG. 3 and input into the container orchestrator. For example, the input may include multiple sections depending on the validations to be performed. For SSH section (e.g., 302), the command may be executed on the host via SSH protocol. Further, the collection in redfish section (e.g., 304) may be executed using redfish protocol. Furthermore, for each command, the expected output may be listed as part of the input payload.

In an example, the plugins may go through the collection, execute the command using the appropriate protocol, and compare the output to the expected output. For example, validation may be successful when all the actual outputs match their expected outputs. In another example, the validation may fail when any of the outputs do not match the expected output.

Thus, in the examples described herein, the validation task in the container orchestrator may include a number of protocol plugins to interact with different infrastructure components. For example, the plugins execute the commands in the JSON input and compare the output with the expected output in the JSON file.

Examples described herein may provide an approach to provision cell sites in a 5G RAN that can be considered universal. For example, examples described herein may be applicable to all vendors, so long as their requirements can be validated via the supported interfaces. Further, the approach may be future proof. The component upgrades may only require changes to the container orchestrator input and no changes to the task may be necessary. For Example, consider Kubernetes Baremetal Deployment 1.22 requires BIOS version of 1.6.5 on a Dell server. Further, consider that the Kubernetes version is upgraded to 1.23 and this introduces two new requirements such as BIOS version 1.7.2 and a memory speed of 3200 MHz. This may introduce two changes to the input. In the BIOS section, the expected output is modified to 1.7.2. A new section is added that checks the memory speed and matches it to 3200 MHz or greater.

Figure 4:
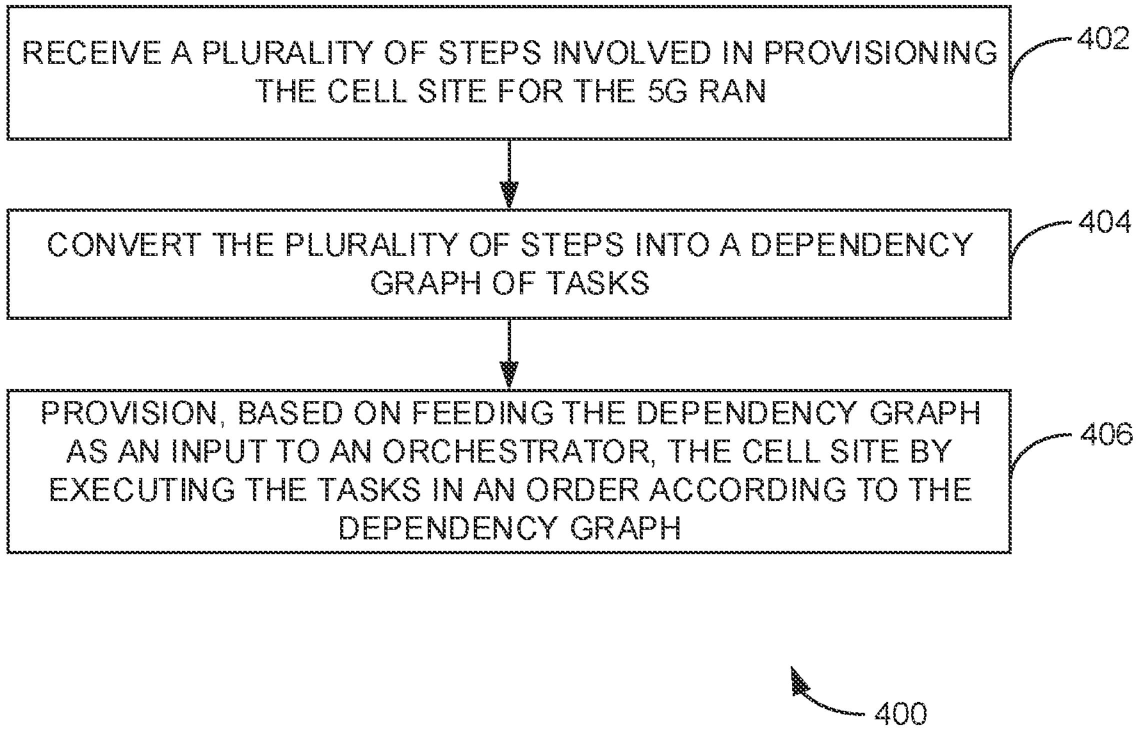
FIG. 4 is a flow diagram illustrating an example method for provisioning a cell site in a 5G RAN.

FIG. 4 is a flow diagram illustrating an example method 400 for provisioning a cell site in a 5G radio-access network (RAN). Example method 400 depicted in FIG. 4 represents generalized illustrations, and other processes may be added, or existing processes may be removed, modified, or rearranged without departing from the scope and spirit of the present application. In addition, method 400 may represent instructions stored on a computer-readable storage medium that, when executed, may cause a processor to respond, to perform actions, to change states, and/or to make decisions. Alternatively, method 400 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 402, a plurality of steps involved in provisioning the cell site for the 5G RAN may be received. In an example, provisioning the cell site may include provisioning of a physical infrastructure layer, a container orchestration platform on the physical infrastructure layer, and a containerized network function (CNF) instance associated with the 5G RAN in the container orchestration platform. For example, provisioning the physical infrastructure layer may include, based on requirements of the CNF instance, preparing a physical host computing system to configure hardware, software, and network resources.

At 404, the plurality of steps may be converted into a dependency graph of tasks. In an example, the dependency graph may represent workflows and relationships between the tasks. For example, converting the plurality of steps into the dependency graph may include constructing the dependency graph including a plurality of vertices and a plurality of edges, each vertex representing a task for execution and each edge representing a path that the orchestrator needs to take upon completion of each task. In an example, each task in the orchestrator may be designed to be idempotent, where a user needs to call an application programming interface (API) irrespective of where the failure occurred in the provisioning of the cell site.

Based on feeding the dependency graph as an input to an orchestrator, at 406, the cell site may be provisioned by executing the tasks in an order according to the dependency graph. In an example, provisioning the cell site may include determining whether the physical infrastructure layer and the container orchestration platform support requirements of the CNF instance. In one example, when the physical infrastructure layer and the container orchestration platform support requirements of the CNF instance, the tasks may invoke documented application programming interfaces (APIs) of the physical infrastructure layer and the container orchestration platform to achieve a required functionality. In another example, when the physical infrastructure layer and the container orchestration platform do not support requirements of the CNF instance, additional tasks may be generated and added to the orchestrator to support the requirements of the CNF instance.

In an example, prior to provisioning the cell site, method 400 may include receiving method of procedure (MOP) steps to validate hardware and/or software requirements of an operating system of the physical infrastructure layer, the container orchestration platform, and the CNF instance from multiple vendors. Further, the MOP steps may be converted into a defined data structure. Furthermore, based on feeding the defined data structure as an input to the orchestrator, the hardware and/or software requirements of the operating system, the container orchestration platform, and the CNF may be validated.

In an example, for each hardware and/or software requirement, validating the hardware and/or software requirements of the operating system, the container orchestration platform, and the CNF may include initiating, by the orchestrator, a command on the physical infrastructure layer by making a call to an interface exposed by a respective hardware and/or software component in the physical infrastructure layer. Further, the result of executing the command may be compared with an expected output in the defined data structure by the orchestrator. In an example, when the result of executing the command matches the expected output, the orchestrator may determine that the validation is successful. In another example, when the result of executing the command does not match the expected output, the orchestrator may determine that the validation is not successful.

Further, method 400 may include monitoring the tasks to determine progress of execution of each task by the orchestrator. Further, the orchestrator may send the progress of each task to a monitoring platform using a common identifier associated with the cell site to establish an identity of the cell site.

In another example, the orchestrator may monitor the tasks to determine the progress of execution of each task. Further, the orchestrator may store the progress of each task in a database using a common identifier associated with the cell site. In response to receiving a request, the orchestrator may create a site level view of the cell site by querying the database using the common identifier.

Figure 5:
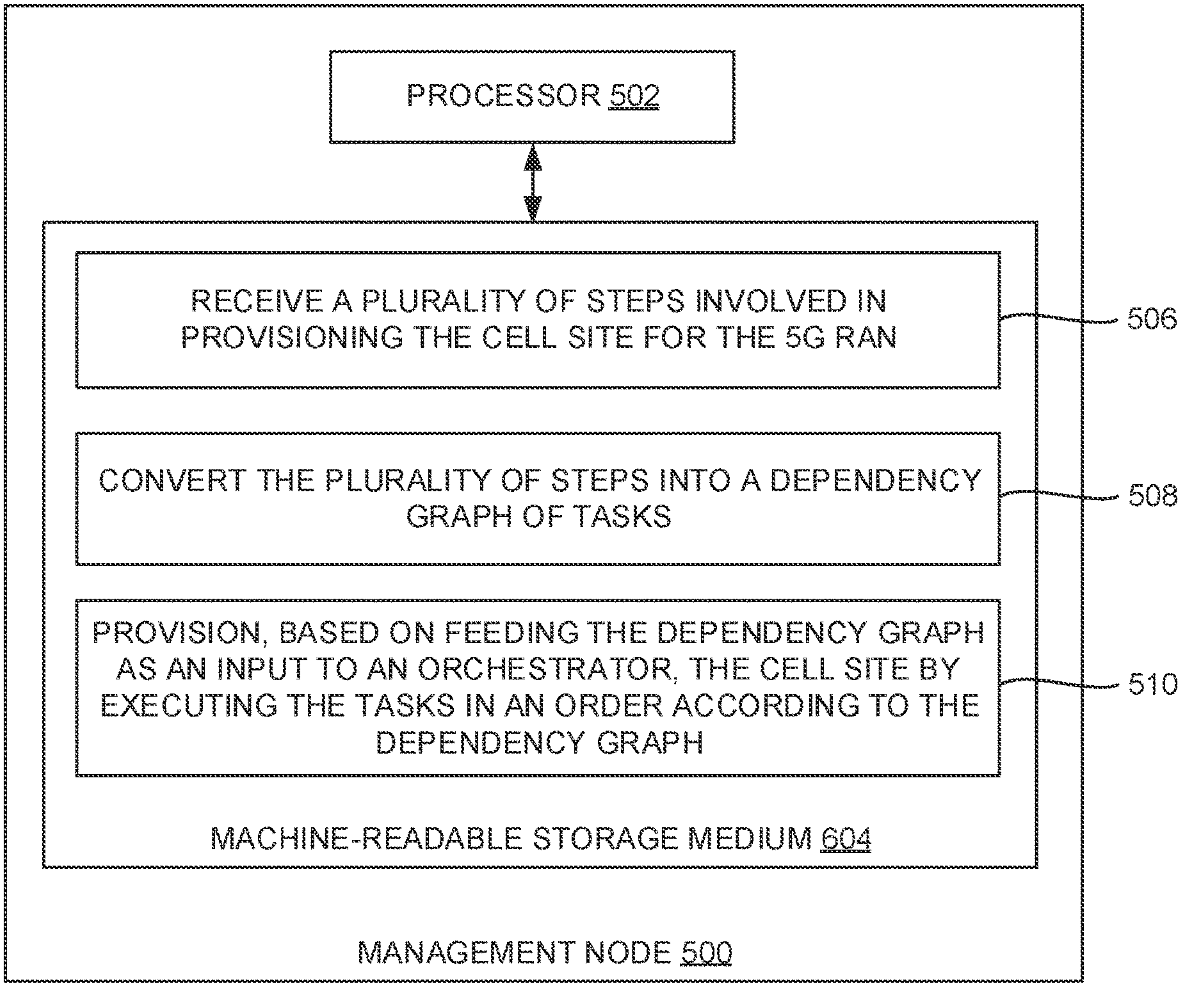
FIG. 5 is a block diagram of an example management node including non-transitory computer-readable storage medium storing instructions to provision a cell site in a 5G RAN.

FIG. 5 is a block diagram of an example management node 500 including non-transitory computer-readable storage medium 504 storing instructions to provision a cell site in a 5G radio-access network (RAN). Management node 500 may include a processor 502 and computer-readable storage medium 504 communicatively coupled through a system bus. Processor 502 may be any type of central processing unit (CPU), microprocessor, or processing logic that interprets and executes computer-readable instructions stored in computer-readable storage medium 504. Computer-readable storage medium 504 may be a random-access memory (RAM) or another type of dynamic storage device that may store information and computer-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory computer-readable medium. In an example, computer-readable storage medium 504 may be remote but accessible to management node 500.

Computer-readable storage medium 504 may store instructions 506, 508, and 510. Instructions 506 may be executed by processor 502 to receive a plurality of steps involved in provisioning the cell site for the 5G RAN. In an example, provisioning the cell site may include provisioning of a physical infrastructure layer, a container orchestration platform on the physical infrastructure layer, and a containerized network function (CNF) instance associated with the 5G RAN in the container orchestration platform.

Instructions 508 may be executed by processor 502 to convert the plurality of steps into a dependency graph of tasks. The dependency graph may represent workflows and relationships between the tasks. In an example, instructions 508 to convert the plurality of steps into the dependency graph may include instructions to construct the dependency graph comprising a plurality of vertices and a plurality of edges, each vertex representing a task for execution and each edge representing a path that the orchestrator needs to take upon completion of each task.

Instructions 510 to may include instructions to provision, based on feeding the dependency graph as an input to an orchestrator, the cell site by executing the tasks in an order according to the dependency graph. In an example, instructions 510 to provision the cell site may include instructions to determine whether the physical infrastructure layer and the container orchestration platform support requirements of the CNF instance. In an example, when the physical infrastructure layer and the container orchestration platform support requirements of the CNF instance, documented application programming interfaces (APIs) of the physical infrastructure layer and the container orchestration platform may be invoked by the tasks to achieve a required functionality. In another example, when the physical infrastructure layer and the container orchestration platform do not support requirements of the CNF instance, additional tasks may be generated and added to the orchestrator to support the requirements of the CNF instance.

In an example, prior to provisioning the cell site, computer-readable storage medium 504 may store instructions to receive method of procedure (MOP) steps to validate hardware and/or software requirements of an operating system of the physical infrastructure layer, the container orchestration platform, and the CNF instance from multiple vendors. Further, computer-readable storage medium 504 may store instructions to convert the MOP steps into a defined data structure and validate, based on feeding the defined data structure as an input to the orchestrator, the hardware and/or software requirements of the operating system, the container orchestration platform, and the CNF.

Further, computer-readable storage medium 504 may store instructions to monitor, by the orchestrator, the tasks to determine a progress of execution of each task, store, by the orchestrator, the progress of each task in a database using a common identifier associated with the cell site and in response to receiving a request, create, by the orchestrator, a site level view of the cell site by querying the database using the common identifier.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not be meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method for provisioning a cell site in a 5G radio-access network (RAN) comprising:

receiving a plurality of steps involved in provisioning the cell site for the 5G RAN, wherein provisioning the cell site comprises provisioning of a physical infrastructure layer, a container orchestration platform on the physical infrastructure layer, and a containerized network function (CNF) instance associated with the 5G RAN in the container orchestration platform;

converting the plurality of steps into a dependency graph of tasks, wherein the dependency graph is to represent workflows and relationships between the tasks, the dependency graph of tasks comprising stages for host provisioning, Kubernetes provisioning, and network function deployment stitched into a workflow, the plurality of steps being associated with an input payload, the input payload listing a command and an expected output;

validating requirements by executing the command and matching an output of the command with the expected output listed in the input payload; and provisioning, based on feeding the dependency graph as an input to an orchestrator, the cell site by executing the tasks in an order according to the dependency graph.

2. The method of claim 1, further comprising:

prior to provisioning the cell site, receiving method of procedure (MOP) steps to validate hardware and/or software requirements of an operating system of the physical infrastructure layer, the container orchestration platform, and the CNF instance from multiple vendors;

converting the MOP steps into a defined data structure; and validating, based on feeding the defined data structure as an input to the orchestrator, the hardware and/or software requirements of the operating system, the container orchestration platform, and the CNF.

3. The method of claim 2, wherein validating the hardware and/or software requirements of the operating system, the container orchestration platform, and the CNF comprises:

for each hardware and/or software requirement:

initiating, by the orchestrator, a command on the physical infrastructure layer by making a call to an interface exposed by a respective hardware and/or software component in the physical infrastructure layer;

comparing, by the orchestrator, a result of executing the command with an expected output in the defined data structure;

when the result of executing the command matches the expected output, determining, by the orchestrator, that the validation is successful; and when the result of executing the command does not match the expected output, determining, by the orchestrator, that the validation is not successful.

4. The method of claim 1, wherein converting the plurality of steps into the dependency graph comprises:

constructing the dependency graph comprising a plurality of vertices and a plurality of edges, each vertex representing a task for execution and each edge representing a path that the orchestrator needs to take upon completion of each task.

5. The method of claim 1, wherein provisioning the physical infrastructure layer comprises:

based on requirements of the CNF instance, preparing a physical host computing system to configure hardware, software, and network resources.

6. The method of claim 1, wherein each task in the orchestrator is designed to be idempotent, where a user needs to call an application programming interface (API) irrespective of where a failure occurred in the provisioning of the cell site.

7. The method of claim 1, further comprising:

monitoring, by the orchestrator, the tasks to determine a progress of execution of each task; and sending, by the orchestrator, the progress of each task to a monitoring platform using a common identifier associated with the cell site to establish an identity of the cell site.

8. The method of claim 1, further comprising:

monitoring, by the orchestrator, the tasks to determine a progress of execution of each task;

storing, by the orchestrator, the progress of each task in a database using a common identifier associated with the cell site; and in response to receiving a request, creating, by the orchestrator, a site level view of the cell site by querying the database using the common identifier.

9. The method of claim 1, wherein provisioning the cell site comprises:

determining whether the physical infrastructure layer and the container orchestration platform support requirements of the CNF instance;

when the physical infrastructure layer and the container orchestration platform support requirements of the CNF instance, invoking, by the tasks, documented application programming interfaces (APIs) of the physical infrastructure layer and the container orchestration platform to achieve a required functionality; and when the physical infrastructure layer and the container orchestration platform do not support requirements of the CNF instance, generating and adding additional tasks to the orchestrator to support the requirements of the CNF instance.

10. A management node comprising:

a processor; and memory coupled to the processor, wherein the memory comprises:

a container orchestrator to automate deployment, management, and scaling of containerized network function (CNF) instances; and a cell site provisioning unit to:

receive a plurality of steps involved in provisioning a cell site for a 5G RAN, wherein provisioning the cell site comprises provisioning of a physical infrastructure layer, a container orchestration platform on the physical infrastructure layer, and a CNF instance associated with the 5G RAN in the container orchestration platform;

convert the plurality of steps into a dependency graph of tasks, wherein the dependency graph is to represent workflows and relationships between the tasks, the dependency graph of tasks comprising stages for host provisioning, Kubernetes provisioning, and network function deployment stitched into a workflow, the plurality of steps being associated with an input payload, the input payload listing a command and an expected output;

validate requirements by executing the command and matching an output of the command with the expected output listed in the input payload; and provision, based on feeding the dependency graph as an input to the container orchestrator, the cell site by executing the tasks in an order according to the dependency graph.

11. The management node of claim 10, further comprising:

a validation unit to:

prior to provisioning the cell site, receive method of procedure (MOP) steps to validate hardware and/or software requirements of an operating system of the physical infrastructure layer, the container orchestration platform, and the CNF instance from multiple vendors;

convert the MOP steps into a defined data structure; and validate, based on feeding the defined data structure as an input to the container orchestrator, the hardware and/or software requirements of the operating system, the container orchestration platform, and the CNF.

12. The management node of claim 11, wherein the validation unit is to:

for each hardware and/or software requirement, enable the container orchestrator to:

initiate a command on the physical infrastructure layer by making a call to an interface exposed by a respective hardware and/or software component in the physical infrastructure layer;

compare a result of executing the command with an expected output in the defined data structure;

when the result of executing the command matches the expected outputs, determine that the validation is successful; and when the result of executing the command does not match the expected output, determine that the validation is not successful.

13. The management node of claim 10, wherein the dependency graph comprises a plurality of vertices and a plurality of edges, each vertex representing a task for execution and each edge representing a path that the container orchestrator needs to take upon completion of each task.

14. The management node of claim 10, wherein the container orchestrator is to:

based on requirements of the CNF instance, provision the physical infrastructure layer by preparing a physical host computing system to configure hardware, software, and network resources.

15. The management node of claim 10, wherein the container orchestrator is to:

determine whether the physical infrastructure layer and the container orchestration platform support requirements of the CNF instance;

when the physical infrastructure layer and the container orchestration platform support requirements of the CNF instance, invoke, by the tasks, documented application programming interfaces (APIs) of the physical infrastructure layer and the container orchestration platform to achieve a required functionality; and when the physical infrastructure layer and the container orchestration platform do not support requirements of the CNF instance, generate and add additional tasks to the orchestrator to support the requirements of the CNF instance.

16. A non-transitory computer readable storage medium comprising instructions executable by a processor of a management node to:

receive a plurality of steps involved in provisioning the cell site for the 5G RAN, wherein provisioning the cell site comprises provisioning of a physical infrastructure layer, a container orchestration platform on the physical infrastructure layer, and a containerized network function (CNF) instance associated with the 5G RAN in the container orchestration platform;

convert the plurality of steps into a dependency graph of tasks, wherein the dependency graph is to represent workflows and relationships between the tasks, the dependency graph of tasks comprising stages for host provisioning, Kubernetes provisioning, and network function deployment stitched into a workflow, the plurality of steps being associated with an input payload, the input payload listing a command and an expected output;

validate requirements by executing the command and matching an output of the command with the expected output listed in the input payload; and provision, based on feeding the dependency graph as an input to an orchestrator, the cell site by executing the tasks in an order according to the dependency graph.

17. The non-transitory computer readable storage medium of claim 16, further comprising instructions to:

prior to provisioning the cell site, receive method of procedure (MOP) steps to validate hardware and/or software requirements of an operating system of the physical infrastructure layer, the container orchestration platform, and the CNF instance from multiple vendors;

convert the MOP steps into a defined data structure; and validate, based on feeding the defined data structure as an input to the orchestrator, the hardware and/or software requirements of the operating system, the container orchestration platform, and the CNF.

18. The non-transitory computer readable storage medium of claim 16, wherein instructions to convert the plurality of steps into the dependency graph comprise instructions to:

construct the dependency graph comprising a plurality of vertices and a plurality of edges, each vertex representing a task for execution and each edge representing a path that the orchestrator needs to take upon completion of each task.

19. The non-transitory computer readable storage medium of claim 16, further comprising instructions to:

monitor, by the orchestrator, the tasks to determine a progress of execution of each task;

store, by the orchestrator, the progress of each task in a database using a common identifier associated with the cell site; and in response to receiving a request, create, by the orchestrator, a site level view of the cell site by querying the database using the common identifier.

20. The non-transitory computer readable storage medium of claim 16, wherein instructions to provision the cell site comprise instructions to:

determine whether the physical infrastructure layer and the container orchestration platform support requirements of the CNF instance;

when the physical infrastructure layer and the container orchestration platform support requirements of the CNF instance, invoke, by the tasks, documented application programming interfaces (APIs) of the physical infrastructure layer and the container orchestration platform to achieve a required functionality; and when the physical infrastructure layer and the container orchestration platform do not support requirements of the CNF instance, generate and add additional tasks to the orchestrator to support the requirements of the CNF instance.

* * * * *